United States Patent
Reading et al.

(10) Patent No.: US 11,876,759 B2
(45) Date of Patent: *Jan. 16, 2024

(54) ASYMMETRIC PERMISSIONS IN A COMMUNICATIONS SYSTEM

(71) Applicant: Novastone Media Ltd., London (GB)

(72) Inventors: Peter Reading, London (GB); Douglas Orr, London (GB)

(73) Assignee: Novastone Media Ltd., London (GB)

(*) Notice: Subject to any disclaimer, the term of this patent is extended or adjusted under 35 U.S.C. 154(b) by 563 days.

This patent is subject to a terminal disclaimer.

(21) Appl. No.: 17/082,739

(22) Filed: Oct. 28, 2020

(65) Prior Publication Data

US 2021/0075751 A1 Mar. 11, 2021

Related U.S. Application Data

(63) Continuation of application No. 16/716,844, filed on Dec. 17, 2019, now Pat. No. 10,841,254, which is a
(Continued)

(30) Foreign Application Priority Data

Feb. 27, 2015 (GB) .................................. 1503403.6

(51) Int. Cl.
*H04L 12/58* (2006.01)
*H04L 29/06* (2006.01)
(Continued)

(52) U.S. Cl.
CPC ............ *H04L 51/04* (2013.01); *H04L 9/3268* (2013.01); *H04L 51/216* (2022.05);
(Continued)

(58) Field of Classification Search
CPC ....... H04L 51/04; H04L 67/01; H04L 51/216; H04L 9/3268; H04L 63/0442;
(Continued)

(56) References Cited

U.S. PATENT DOCUMENTS

| 8,433,824 B2 | 4/2013 | Barrett et al. |
| 8,479,266 B1 | 7/2013 | Delker et al. |

(Continued)

FOREIGN PATENT DOCUMENTS

| CN | 101562617 | 10/2009 |
| CN | 101689153 | 3/2010 |

(Continued)

OTHER PUBLICATIONS

UK search report for corresponding Appl No. GB1503403.6, dated Aug. 26, 2016. (3 pages).

(Continued)

*Primary Examiner* — Yonas A Bayou

(74) *Attorney, Agent, or Firm* — Fish & Richardson P.C.

(57) ABSTRACT

A communication system comprising a server and a plurality of clients constrained so that in order to communicate with each other by means of the system they must communicate via the server, the server having access to a set of stored communication rules defining permitted and/or non-permitted communications between the clients and the server being configured to, on receiving a message from a first client designating as recipients a second client and a third client, the first client matching a first set of characteristics stored in the communication rules and the second client and the third client being clients who are not permitted to directly communicate according to the communication rules, alter the communication rules to permit the second and third clients to directly communicate.

20 Claims, 2 Drawing Sheets

Related U.S. Application Data continuation of application No. 15/553,791, filed as application No. PCT/GB2016/050520 on Feb. 29, 2016, now Pat. No. 10,523,601.

(51) Int. Cl.

| | | |
|---|---|---|
| *H04L 9/32* | (2006.01) | |
| *H04L 51/04* | (2022.01) | |
| *H04L 9/40* | (2022.01) | |
| *H04L 51/216* | (2022.01) | |
| *H04L 67/01* | (2022.01) | |
| *H04L 51/48* | (2022.01) | |
| *G06Q 40/02* | (2023.01) | |

(52) U.S. Cl.
CPC .......... *H04L 63/0442* (2013.01); *H04L 63/10* (2013.01); *H04L 63/108* (2013.01); *H04L 67/01* (2022.05); *G06Q 40/02* (2013.01); *H04L 51/48* (2022.05); *H04L 63/08* (2013.01)

(58) Field of Classification Search
CPC ....... H04L 63/10; H04L 63/108; H04L 51/48; H04L 63/08; G06Q 40/02
See application file for complete search history.

(56) References Cited

U.S. PATENT DOCUMENTS

| | | | |
|---|---|---|---|
| 9,603,171 B2 | 3/2017 | Luft et al. | |
| 10,173,008 B2* | 1/2019 | Simpson | ................ G16H 10/60 |
| 10,523,601 B2 | 12/2019 | Reading et al. | |
| 10,841,254 B2 | 11/2020 | Reading et al. | |
| 2007/0112957 A1 | 5/2007 | Vijnan et al. | |
| 2009/0006548 A1* | 1/2009 | Ramanathan | ........ G06Q 10/107 |
| | | | 709/204 |
| 2009/0063639 A1* | 3/2009 | Lingafelt | ............... G06Q 10/06 |
| | | | 709/206 |
| 2010/0030734 A1* | 2/2010 | Chunilal | ............... H04L 51/214 |
| | | | 709/205 |
| 2011/0225373 A1* | 9/2011 | Ito | ........................... H04L 63/20 |
| | | | 711/145 |
| 2014/0208384 A1* | 7/2014 | Youssefian | .......... H04L 63/0884 |
| | | | 726/3 |
| 2015/0163206 A1* | 6/2015 | McCarthy | ............. H04L 63/104 |
| | | | 726/4 |
| 2015/0295873 A1 | 10/2015 | Orr | |
| 2015/0310188 A1* | 10/2015 | Ford | ....................... G06F 21/10 |
| | | | 726/28 |
| 2017/0228655 A1* | 8/2017 | Alarie | ..................... G06Q 10/10 |
| 2017/0279929 A1* | 9/2017 | Kruger | .................. H04L 63/083 |
| 2018/0041452 A1* | 2/2018 | Reading | ................ H04L 63/108 |
| 2018/0077542 A1* | 3/2018 | Xie | ......................... H04W 4/12 |
| 2018/0081899 A1* | 3/2018 | Brown | .................. G06F 21/604 |
| 2020/0145352 A1 | 5/2020 | Reading et al. | |

FOREIGN PATENT DOCUMENTS

| | | |
|---|---|---|
| CN | 102902674 | 1/2013 |
| CN | 103259715 | 8/2013 |
| CN | 103546369 | 1/2014 |
| CN | 104283894 | 1/2015 |
| WO | WO 02/084948 | 10/2002 |
| WO | WO 2008/060300 A1 | 5/2008 |

OTHER PUBLICATIONS

International Search Report for corresponding Appl No. PCT/GB2016/050520, dated Jun. 8, 2016. (6 pages).
International Preliminary Report on Patentability in International Appln. No. PCT/GB216/050520, dated Sep. 8, 2017, 8 pages.
Written Opinion in International Appln. No. PCT/GB2016/050520, dated Sep. 1, 2016, 6 pages.

\* cited by examiner

ASYMMETRIC PERMISSIONS IN A COMMUNICATIONS SYSTEM

RELATED APPLICATIONS

This application is a continuation of and claims priority under 35 U.S.C. § 120 to application Ser. No. 16/716,844, filed on Dec. 17, 2019, which is a continuation of and claims priority under 35 U.S.C. § 120 to application Ser. No. 15/553,791, filed on Aug. 25, 2017, which is a national stage of and claims priority under 35 U.S.C. § 371 to PCT Application No. PCT/GB2016/050520, filed on 29 Feb. 2016, which claims priority to British Application No. GB 1503403.6, filed on 27 Feb. 2015. The contents of each of these priority applications are hereby incorporated by reference in their entirety.

This invention relates to permissions in a communications system.

BACKGROUND

Historically, when businesses have communicated with clients it has been possible to establish protocols that govern the situations in which one member of staff is permitted to communicate with a client. For example, a bank may establish an internal protocol that mandates that specialist members of staff can only communicate with a client on a particular matter after the client has raised that matter with their relationship manager at the bank and the bank has introduced the client to the specialist. Protocols of this sort have limitations in a world of modern communications. First, it is difficult to ensure compliance. It is not impossible for the specialist to contact the client directly without having been introduced by the relationship manager. Second, even if staff at the business observe the protocol it is not practical to bar the client from contacting a particular person, so the protocol does not ensure that the client manager is involved in all communications. Third, such a protocol is not readily applicable to the problems that arise in conventional digital communications systems. This will be discussed in more detail below, but in general it can be noted that increasing reliance on technology tends to bring an increasing reliance on automatic measures to prevent policies being breached.

Conventional mechanisms by which members of staff at a business may communicate with clients include telephone and email. Telephone has the disadvantages that it requires specific infrastructure to ensure that all calls are recorded for regulatory purposes, that it takes time to coordinate and run calls especially when recorded lines are involved, and that in any event there are often times when people are occupied on other matters and cannot communicate conveniently by phone. Email has the disadvantage that it is inconvenient to ensure encryption and authentication. Some organisations have developed custom web-based portals through which advisors can communicate securely with clients. However, these are inconvenient for clients to use.

Outside the field of business, instant messaging (IM) or chat platforms have become popular, particularly with the advent of mobile technology. IM is conventionally supported by a client application running on a user device, for example a smartphone or a computer terminal. The client application presents a user interface from which a user can generate messages for transmission to other users, and view messages received from other users. When a message is to be transmitted the client application can cause the user device to transmit that message to one or more remote servers operated by the organisation that provides the IM platform in question. Those servers then direct the message to the client application of the intended recipient. IM messages are typically transmitted over internet protocols.

Typically, a user communicates via IM by first logging into an IM account by means of the IM client application. Once logged in, the user can see which of his/her contacts are also logged in. This information is derived from the servers of the IM provider or by leveraging the contacts known to the client on their device in some cases. The user can communicate with one more of those users. Some IM clients allow the user also to transmit messages to contacts not currently logged into their account, who can then view the messages once they are logged in. One particular feature of IM is that the IM messages pass via a dedicated back-end operated by the organisation that provides the IM platform in question.

Once one or more messages have been exchanged between two participants in an IM system that session can be continued by the exchange of further messages as a chat session. All messages between a pair of users can be treated as part of a single chat session. Alternatively, a chat session may be given a title or other identifier, and messages may be assigned to a particular chat session, for example to distinguish the chat sessions by subject matter.

In many conventional IT systems, permissions can be set to govern the actions that users may take. Typically, individual users are assigned to groups, and permissions are assigned to those groups. For example, users who have been assigned to a "compliance" group may be permitted to see all communications between a business's staff and its clients, whereas users assigned to a "specialists" group may be barred from communication with clients by default. This approach makes it relatively straightforward to manage and police standard permissions in a large organisation. However, this approach is unsuitable for providing an optimum set of relationships in a business with complex client requirements. For example, a specialist may be ordinarily barred from communicating directly with clients, but it may be desired for that specialist to communicate with a client after having been introduced by a relationship manger. This would mean assigning individual permissions to that specialist that differ from his or her normal group permissions. Typically, setting up individual permissions is complicated to implement and difficult to police because once individual rights have been given to many different users it becomes difficult to supervise all the permissions to ensure that they remain correctly limited. Furthermore, in any conventional communications system it is difficult or impossible to establish permissions that are individualised to a particular matter.

There is a need for an improved communication system.

BRIEF SUMMARY OF THE INVENTION

According to the present invention there is provided a communication system comprising a server and a plurality of clients constrained so that in order to communicate with each other by means of the system they must communicate via the server, the server having access to a set of stored communication rules defining permitted and/or non-permitted communications between the clients and the server being configured to, on receiving a message from a first client designating as recipients a second client and a third client, the first client matching a first set of characteristics stored in the communication rules and the second client and the third client being clients who are not permitted to directly communicate according to the communication rules, alter the communication rules to permit the second and third clients to directly communicate.

The first set of characteristics may be or include that the first client has an administration right in respect of the third client.

The communication rules may have a default state and the first set of characteristics may be or include that the default state permits communications between the first client and both the second and third clients.

The first set of characteristics may be or included that the communication rules currently permit communications between the first client and both the second and third clients.

The server may be configured so as not to alter the communication rules to grant additional permissions in response to any activity of the third client.

The server may be configured to associate with each message a thread identifier which identifies a thread to which the message belongs. The server may be configured to, on receiving the message from a first client designating as recipients a second client and a third client, alter the communication rules to permit the second and third clients to directly communicate only in respect of the thread to which the said message belongs.

The server may be configured to, in response to an instruction received from the first client, revoke the permission of the second and third clients to directly communicate.

The server may be configured to, in response to a predetermined time elapsing since the last direct communication between the second and third clients, alter the communication rules to revoke the permission of the second and third clients to directly communicate.

The system may be configured to, after the permission of the second client to directly communicate with the third client has been revoked, prevent the second client from viewing previous communications with the third client.

The server may be configured so that in order for message communications of the system to take place between the server and a client the client must be authenticated to the server.

The server maybe configured to permit messages to pass between the clients only in accordance with the stored communication rules as they exist from time to time.

According to a second aspect of the present invention there is provided a method for operating a communication system comprising a server and a plurality of clients constrained so that in order to communicate with each other by means of the system they must communicate via the server, the server having access to a set of stored communication rules defining permitted and/or non-permitted communications between the clients and the method comprising: at the server, receiving a message from a first client designating as recipients a second client and a third client, the first client matching a first set of characteristics stored in the communication rules and the second client and the third client being clients who are not permitted to directly communicate according to the communication rules, and in response to that message altering the communication rules to permit the second and third clients to directly communicate.

The present invention will now be described by way of example with reference to the accompanying drawings.

DETAILED DESCRIPTION

Figure 1:
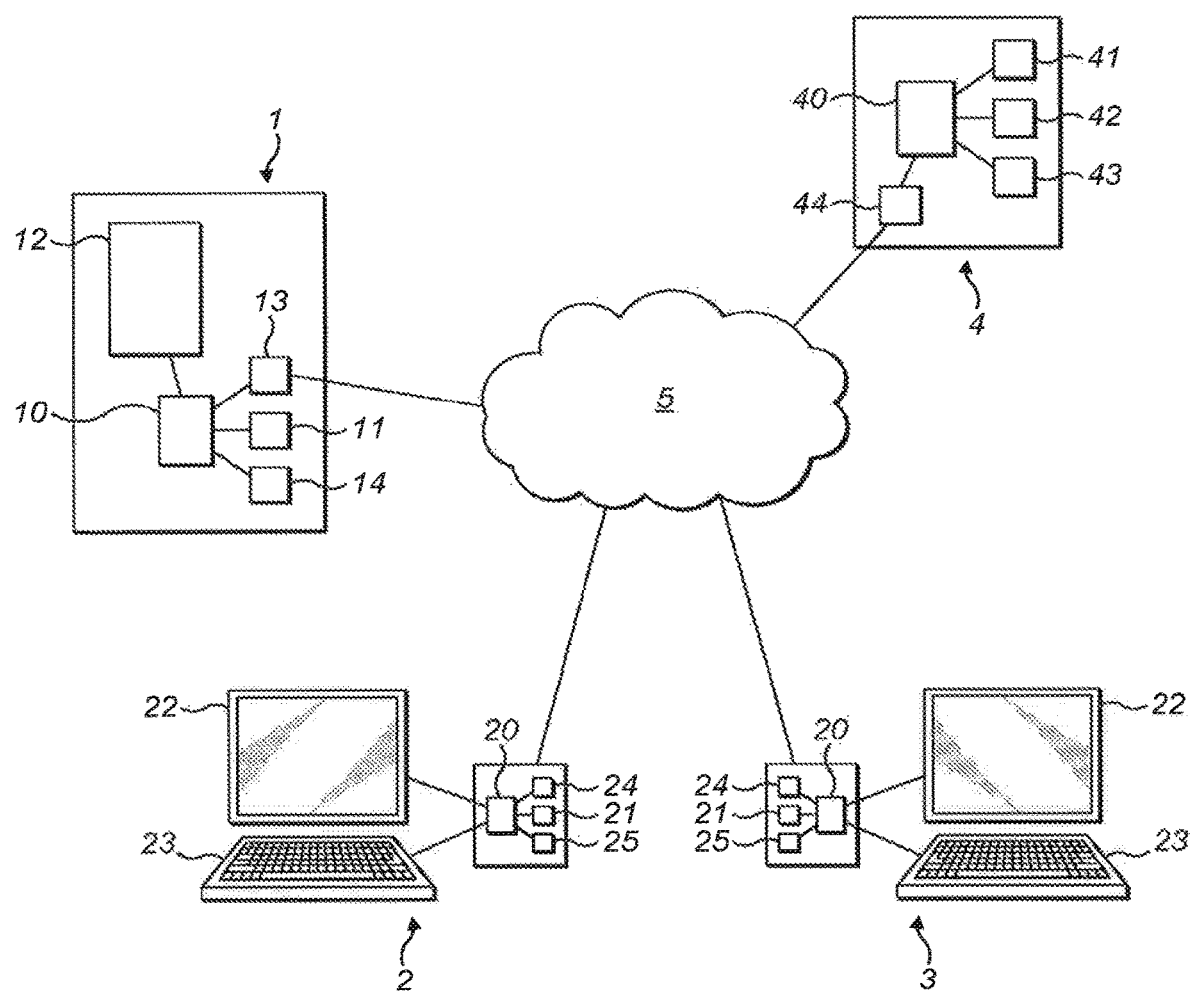
FIG. 1 is a schematic diagram of a system for implementing instant messaging communication.

FIG. 1 illustrates a system for implementing instant messaging communications. The system comprises a central server 4 and client devices 1, 2, 3. There may be many other clients in the system, each of which may be implemented as a smartphone, a computer or another form of device. The client devices can communicate with each other using the system, but all communications within the IM system between any of the clients go via the server. In this architecture, the only communication link that each client needs to establish in order to participate in the IM system is with the server. Since the server is an endpoint in all such links, this relationship permits communications in the IM system to be readily encrypted and authenticated. Furthermore, since the server is involved in forwarding every communication from an originating client to one or more receiving clients the server is able to enforce pre-configured rules regarding which clients may communicate with which other clients.

Client device 1 is a smartphone. The smartphone comprises a processor 10, a non-volatile memory 11, a touch-sensitive display 12 and a wireless communication interface 13. The memory 11 stores, in non-transient form, software code that can be executed by the processor 10. That software includes an instant messaging client application which implements the functions necessary to have the client device 1 function as a client in the IM system. Those include composing and sending messages, receiving and displaying messages, and optionally storing messages in a temporary memory 14 of the client device. Messages may be composed and selected for display by means of inputs provided using the touch-sensitive display 12. Messages may be displayed on the display 12. The temporary memory 14 may store user credentials that can be used to authenticate the client device to the server so that the user does not need to log in each time the application is used. The credentials may, for example, include any one or more of the following: a public key, a private key and a pin code.

Client devices 2 and 3 are computers such as desktop or notebook computers. Each comprise a processor 20, a non-volatile memory 21, a display 22, a keyboard 23 and a network interface 24. The memory 21 stores, in non-transient form, software code that can be executed by the processor 20. That software includes an instant messaging client application which implements the functions necessary to have the respective client device function as a client in the IM system. Those include composing and sending messages, receiving and displaying messages, and optionally storing messages in a temporary memory 25 of the client device. Messages may be composed and selected for display by means of inputs provided using the keyboard 23. Messages may be displayed on the display 22. The temporary memory 25 may store user credentials that can be used to authenticate the client device to the server so that the user does not need to log in each time the application is used.

The IM client may be implemented as a stand-alone application or through a web browser.

The clients can communicate with the server 4 via a network 5. The network 5 may be a publically-accessible network such as the internet.

The server comprises a processor 40, a non-volatile memory 41, a message database 42, a configuration database 43, and a network interface 44. The memory 41 stores in a non-transient way program code executable by the processor 40 to permit it to execute its functions as an IM server. The message database 42 holds details of messages that have been sent using the system. The configuration database holds configuration information such as client credentials and definitions of the circumstances under which particular clients may communicate with other clients. The server may be constituted by a single device, as illustrated in FIG. 1; or its functions may be divided between multiple separate server devices, which could be in the same or different locations.

When an IM client is in operation its client application establishes a communication link with the server via the network 5. To set up the link the IM client authenticates itself to the server. In that way the server can be certain that when it delivers messages to the IM client that client is entitled to view those messages. The authentication may be of the IM client device (e.g. a unique identifier associated with the device) and/or of user-specific credentials associated with a user of the device (e.g. a username and password) and/or of the IM application itself, to verify that that application is authorised and trusted by the operator of the system. The communication link may be encrypted. The authentication and encryption may be implemented using any suitable protocols. Once the IM client is authenticated to the server the server can transmit to the client any messages that have been generated by other users and that the IM client is entitled to view. Those messages can then be displayed by the IM client application running on the client. A user of the client application can select and read messages, compose new messages in reply, and originate new messages to be forwarded by the server to one or more other users. It is preferred that when a user generates a new message the client application does not permit the user to enter an arbitrary recipient for the message. Rather, it is preferred that the IM client application restricts the user so that the only recipients that can be designated are individual users whose details are already available to the client application at the time of composing the message. The IM client application may store locally, or may receive from the server, a list of permissible recipients, and the user may be restricted to choosing a recipient from amongst that list.

It will be appreciated that this IM system differs in various ways from other communications systems such as email. Most notably, because all communications go via a single server, or via a single server entity in which individual server devices operate according to a common set of configuration rules it can be assured that the system will be governed by those rules. The rules may dictate matters such as the authentication of clients and/or which clients may communicate with which other clients.

When multiple messages have been exchanged between users, the system may treat those messages in one of two ways. In non-threaded operation the system treats all those messages as forming part of a single conversation stream or chat session. When one user access his history of messages with the other user he can see all the past messages with that user, subject to any filtering that may have taken place for example by the deletion, redaction or archiving of messages. In threaded operation each message is allocated to a message thread. This may be done by the server storing in association with each message a thread identifier that designates which thread the message belongs to. Each thread may be allotted a subject, which may be entered by one of the users either when the first message in the thread is created or subsequently. That subject may be displayed by the client application to permit a user to readily find messages of that thread. When a user of a client application has selected a thread, or a message belonging to a thread, the client application may then automatically filter the messages that that user of that application is permitted to view, so as to display only messages of that thread. In this mode of operation each thread is treated as a distinct conversation stream or chat session.

Figure 2:
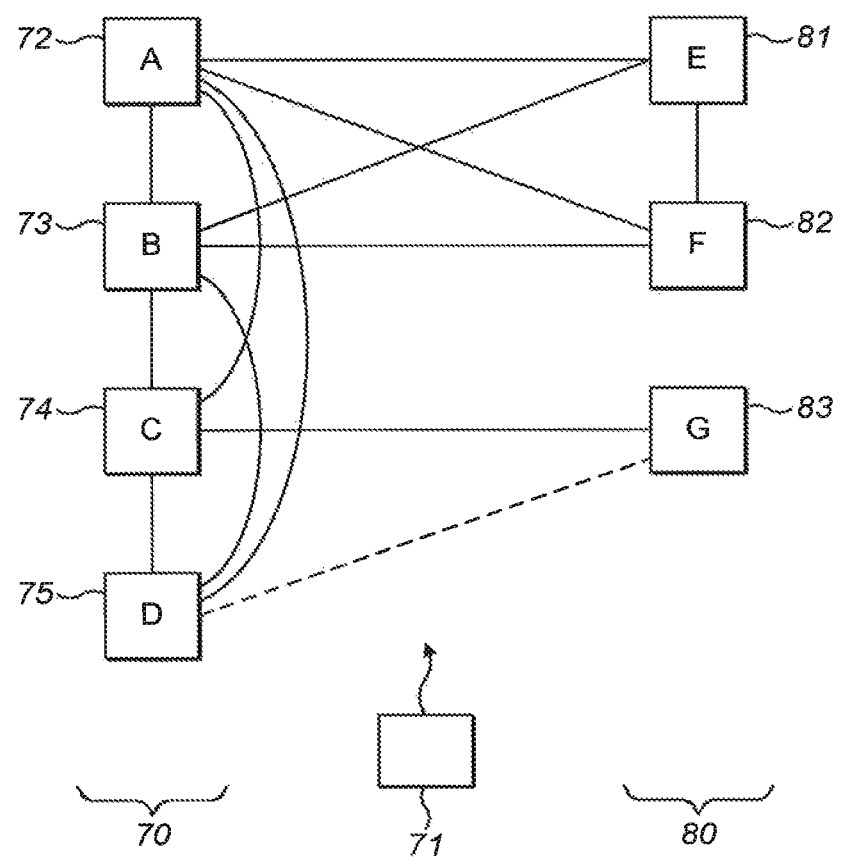
FIG. 2 illustrates relationships between users in an instant messaging network.

FIG. 2 illustrates potential communication paths between users in the system. In this example the IM system is providing communication facilities between a bank and its clients. Users who are employees of the bank are indicated at 70. Users who are clients of the bank are illustrated at 80. The employees include relationship managers 72 ("Alice"), 73 ("Bob"), 74 ("Charles") and a specialist 75 ("Diane"). The bank's clients include clients 81 ("Edgar") and 82 ("Fiona") who have a joint account relationship with the bank and client 83 ("Graham"). Edgar and Fiona's account with the bank is managed by Alice and Bob. Graham's account with the bank is managed by Charles.

The bank users 70 may include a further user illustrated at 71 having more generalised access to chats. Such a user may have one of two sets of privileges. In a first arrangement, the user is able to view chats between any bank user and any client, but the system is configured so that a client is unable to message the user 71 directly. A user of this type may, for example, be in a compliance team to oversee the activities of bank staff. In a second arrangement, the user may be able to view chats between any bank user and any client and may be able to message a client but the system is configured so that a client cannot initiate messaging with this user. A user of this type may, for example, be employed at a call centre to assist clients with general queries. The rights of both of these types of user are asymmetric with the client users.

The bank uses the IM system to communicate with its clients. An IM system has a number of advantages for this form of communication. Those include its perceived immediacy and the ease of authenticating, securing and logging communications between users, as well as the facility to govern potential communication channels, as will be described below.

The server 4 implementing the IM system holds a database 43 designating the communications that are permitted between various users in the system. Those permissions are by default as follows, as indicated by solid lines in FIG. 2.

Alice and Bob are permitted to transmit IM messages to Edgar and Fiona, and Edgar and Fiona are permitted to transmit IM messages to Alice and Bob. By default, Edgar and Fiona are not permitted to transmit IM messages to anyone apart from each other and Alice and Bob.

Charles is permitted to transmit IM messages to Graham, and Graham is permitted to transmit IM messages to Charles. By default, Graham is not permitted to transmit IM messages to anyone apart from Charles.

All the bank staff are permitted to transmit IM messages to each other, but not to bank clients except as indicated above.

This configuration has a number of significant properties. First, the IM users have substantially different default permissions in that the bank client users 80 are not permitted to message other bank client users (except those with whom they share an account, or with other individuals who are permitted to have access to that account—such as an external financial adviser) whereas the staff users 70 are permitted to message all other staff users. This asymmetry improves the security of the system because it assures that bank client users cannot receive messages through the system from untrusted third parties. Furthermore, it is preferred that a bank client user cannot even see that other bank clients 80 are members of the platform unless the bank client user in question is able to message those other bank clients through the system. This allows even the existence of a client's relationship with the bank to be kept confidential. At present, a common source of fraud is for individuals to be contacted by persons claiming to represent their bank, and this property of the present communication system may eliminate the possibility for that form of subterfuge whilst still permitting the system to be used for communication amongst bank staff. Second, the bank users who can initiate a message to a particular bank client are limited to a subset of the bank users, so some bank users (in this example Diane) cannot by default communicate with a bank client. If the system is operating so as to treat messages as belonging to threads, this second property means that bank users such as Diane cannot initiate a new thread with a bank client. As a result any new thread between the bank and a bank client must involve one of the users who are permitted to communicate with bank users by default, in this case the relationship managers Alice, Bob and Charles.

A further source of fraud in present systems is that individuals may send instructions to a bank that purport to originate from a client of the bank. Since many ordinary messaging protocols such as email are not authenticated, this makes it difficult for banks to accept instructions by those means. In contrast, when a client is authenticated to the bank server as in the present system the bank may choose with greater security to rely on the instructions received.

The default permissions can be varied in order to permit a member of the bank staff 70 to communicate with a bank client 80 with whom he cannot normally communicate. For example, Charles may want Diane to provide specialist advice to Graham. In that situation, the server rules can be altered so that Diane and Graham can be temporarily permitted to communicate with each other as indicated by a dashed line in FIG. 2. In many conventional systems, allocating individualised permissions in that way would require specialist intervention by an IT expert. Furthermore, it would be necessary to monitor the individualised permissions in order to manually revoke the individualised permission when the need for it had passed. These complications make individualised permissions onerous to administer in conventional systems.

There may be circumstances where a member of bank staff may want to permit multiple clients who cannot normally message each other through the system to communicate directly with each other. In that situation a member of bank staff who has appropriate rights (e.g. by being able to communicate with both of the clients in question) can permit them to communicate in respect of a specific chat thread or conversation. However, the system bars permitting those clients to initiate a new chat thread with each other.

In the present system, the permission for a member of bank staff (e.g. Diane) to communicate through the system with a bank client (e.g. Graham) can be granted either (i) by any member of bank staff who already has the ability to communicate with the bank client in question or (ii) by any member of bank staff who has the default ability to communicate with the bank client in question or (iii) by any member of bank staff who has a designated relationship with the bank client in question. Which of these three options applies is dependent on the configuration of the system. One convenient way in which a member of bank staff can be permitted to communicate with a bank client is simply by being designated as the co-recipient of a message to the bank client in question. Since each member of bank staff has by default the permission to message other members of bank staff, the identity of the member of bank staff (e.g. Diane) who is to be introduced to the client (e.g. Graham) is already available to the client application of the person performing the introduction (e.g. Charles). This makes it easy for the person performing the introduction to designate the person to be introduced, and reduces the risk of mistakes in the designation process. Thus, in one embodiment the system permits a user to introduce any other user ("D") with whom they have default communication permissions to join a communication session with another user ("G"), and once that has been done the server updates its rules automatically to permit subsequent communications between D and G. This corresponds to option (ii) identified above. Options (i) and (iii) can be implemented in an analogous way. This mode of operation is advantageous because it enables the individualised permissions to be set in a highly intuitive way. Instead of the permissions having to be set explicitly by a permissions control interface, as happens in many current systems, the permissions are set automatically consequent merely on a message being sent.

When the system operates for threaded communications, the server may update its rules so that the users (D and G) who have been introduced by means of individualised permissions are able to communicate only in respect of the specific thread to which the communication by means of which they were introduced belongs. This has an additional advantage since it can alleviate the need to monitor the individualised permissions so as to revoke them once they are no longer needed. Once the matter in respect of which that thread was set up has been concluded the bank staff and the bank client in question will communicate using different communication threads, and any remnant right for a user to exercise individualised permissions in respect of that thread may be considered insignificant. If it is desired to definitively revoke the individualised permission it may be automatically revoked when a predetermined time (e.g. a month) has elapsed since the last communication in the thread in question or since the last communication in the thread in question by the user benefiting from the individualised permission.

When a user's right to communicate in a thread has been revoked, the system may operate in one of two ways. In a first mode of operation, after the user's right has been revoked the server and/or the user's local application bar the user from seeing any messages on that thread. In a second mode of operation, after the user's right has been revoked the server and/or the user's local application permit the user to see messages that were sent on the thread during the period when the user had a right to communicate on that thread, but not to see messages sent after that period.

The system is configured so that once a user's right to communicate in a thread has been revoked they can only resume participation in the thread in the same way as they joined the thread originally: i.e. through invitation by another user having appropriate rights.

The IM client applications may be configured to store messages so that they can be viewed when the respective client device does not have network connectivity to the server. Alternatively, the IM client applications may be configured to download messages from the server whenever they are to be displayed. In either case, it is convenient that if a user had at one time permission to participate in a communication session, and that permission has now been revoked, the user is prevented from viewing messages relating to that session that they do not have permission to view. When messages are cached at the client application for subsequent viewing this property may be achieved by the client application displaying messages to a user only when the user has the right to view and/or reply to them. In this embodiment it is preferred that when an IM client application authenticates to the server the server verifies the identity of not just the user of the application but also of the IM client application. When messages are downloaded at the time of viewing, the server may be configured to provide to an IM client only those messages that the user of the client has the right to view and/or reply to. In this way, once the right of a user has been withdrawn to participate in a communication session (whether threaded or not) the system is capable of blocking the user from viewing past messages in that session even though the user participated in the session. This can be helpful for improving security: for example by ensuring that bank staff do not participate in a conversation once their role in it has passed.

In the examples given above, the system is used to serve communications of a bank. The system may be used for any other appropriate purpose: for example, without limitation, for messaging associated with other financial services or professional services or for business, sales, leisure, personal, government or charitable purposes. The entity described above as a bank could be any other form of organisation.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A communication system comprising:
   a server and a plurality of clients constrained so that in order to communicate with each other by means of the system they communicate via the server, the server having access to a set of stored communication rules defining permitted, non-permitted, or both permitted and non-permitted communications between the clients,
   the server being configured to alter, on receiving a message from a first client designating as recipients a second client and a third client, the first client matching a first set of characteristics stored in the communication rules and the second client and the third client being clients who are not permitted to directly communicate according to the communication rules, the communication rules to permit the second and third clients to directly communicate,
   wherein the server is further configured to, in response to a predetermined time elapsing since the last direct communication between the second and third clients, alter the communication rules to revoke a permission of the second and third clients to directly communicate.

2. The communication system as claimed in claim 1, wherein the first set of characteristics indicates that the first client has an administration right in respect of the third client.

3. The communication system as claimed in claim 1, wherein the communication rules have a default state and the first set of characteristics indicates that the default state permits communications between the first client and both the second and third clients.

4. The communication system as claimed in claim 1, wherein the first set of characteristics indicates that the communication rules currently permit communications between the first client and both the second and third clients.

5. The communication system as claimed in claim 1, wherein the server is configured so as not to alter the communication rules to grant additional permissions in response to any activity of the third client.

6. The communication system as claimed in claim 1, wherein the server is configured to, in response to an instruction received from the first client, revoke the permission of the second and third clients to directly communicate.

7. The communication system as claimed in claim 1, wherein the system is configured to, after the permission of the second client to directly communicate with the third client has been revoked, prevent the second client from viewing previous communications with the third client.

8. The communication system as claimed in claim 1, wherein the server is configured so that in order for message communications of the system to take place between the server and a client the client must be authenticated to the server.

9. The communication system as claimed in claim 1, wherein the server is configured to permit messages to pass between the clients only in accordance with the stored communication rules as they exist from time to time.

10. A method for operating a communication system comprising a server and a plurality of clients constrained so that in order to communicate with each other by means of the system they communicate via the server, the server having access to a set of stored communication rules defining permitted, non-permitted, or both permitted and non-permitted communications between the clients, the method comprising:
    at the server, receiving a message from a first client designating as recipients a second client and a third client, the first client matching a first set of characteristics stored in the communication rules and the second client and the third client being clients who are not permitted to directly communicate according to the communication rules,
    in response to that message, altering the communication rules to permit the second and third clients to directly communicate, and
    altering the communication rules to revoke a permission of the second and third clients to directly communicate in response to a predetermined time elapsing since the last direct communication between the second and third clients.

11. The method of claim 10, wherein the first set of characteristics indicates one or more of:
    that the first client has an administration right in respect of the third client, and
    that the communication rules currently permit communications between the first client and both the second and third clients.

12. The method of claim 10, wherein the communication rules have a default state and the first set of characteristics indicates that the default state permits communications between the first client and both the second and third clients.

13. The method of claim 10, further comprising:
revoking the permission of the second and third clients to directly communicate in response to an instruction received from the first client.

14. The method of claim 10, further comprising:
preventing the second client from viewing previous communications with the third client after the permission of the second client to directly communicate with the third client has been revoked.

15. The method of claim 10, further comprising:
authenticating a client to the server before allowing message communications of the system to take place between the server and the client.

16. The method of claim 10, further comprising:
permitting messages to pass between the clients only in accordance with the stored communication rules as they exist from time to time.

17. The communication system as claimed in claim 1, wherein the second client is unable to detect the third client unless the communication rules are altered to permit the second and third clients to directly communicate.

18. The method as claimed in claim 10, wherein the second client is unable to detect the third client unless the communication rules are altered to permit the second and third clients to directly communicate.

19. The communication system as claimed in claim 1, wherein the system is configured to, after the permission of the second client to directly communicate with the third client has been revoked, permit the second client to view only communications with the third client that were communicated before the permission was revoked.

20. The method as claimed in claim 10, further comprising:
after the permission of the second client to directly communicate with the third client has been revoked, permit the second client to only view communications with the third client that were communicated before the permission was revoked.

* * * * *